(12) United States Patent
Ono et al.

(10) Patent No.: US 11,895,349 B2
(45) Date of Patent: Feb. 6, 2024

(54) SYNCHRONOUS CONTROL DEVICE, SYNCHRONOUS CONTROL METHOD, AND SYNCHRONOUS CONTROL PROGRAM

(71) Applicant: Nippon Telegraph and Telephone Corporation, Tokyo (JP)

(72) Inventors: Masato Ono, Musashino (JP); Takahide Hoshide, Musashino (JP); Yasushi Matsubara, Musashino (JP); Shinji Fukatsu, Musashino (JP); Kenichi Minami, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 204 days.

(21) Appl. No.: 17/611,353

(22) PCT Filed: May 15, 2020

(86) PCT No.: PCT/JP2020/019465
§ 371 (c)(1),
(2) Date: Nov. 15, 2021

(87) PCT Pub. No.: WO2020/241309
PCT Pub. Date: Dec. 3, 2020

(65) Prior Publication Data
US 2022/0224957 A1 Jul. 14, 2022

(30) Foreign Application Priority Data

May 31, 2019 (JP) .................................. 2019-102909

(51) Int. Cl.
*H04N 21/242* (2011.01)
*H04N 21/234* (2011.01)
(Continued)

(52) U.S. Cl.
CPC ....... *H04N 21/242* (2013.01); *H04N 21/2343* (2013.01); *H04N 21/44* (2013.01)

(58) Field of Classification Search
CPC ... H04N 21/242; H04N 21/2343; H04N 21/44
(Continued)

(56) References Cited

U.S. PATENT DOCUMENTS

| 5,598,352 | A | 1/1997 | Rosenau et al. |
| 2020/0344515 | A1* | 10/2020 | Wong ............... H04N 21/43072 |
| 2020/0404386 | A1* | 12/2020 | McCartney, Jr. ............... H04N 21/43074 |

FOREIGN PATENT DOCUMENTS

JP 10-511513 4/1998

OTHER PUBLICATIONS

Association of Radio Industries and Businesses, "MMT-Based Media Transport Scheme in Digital Broadcasting Systems," ARIB Standard, Oct. 11, 2018, STD-B60 Version 1.13, 560 pages.
(Continued)

*Primary Examiner* — Dominic D Saltarelli
(74) *Attorney, Agent, or Firm* — Fish & Richardson P.C.

(57) ABSTRACT

A synchronous shift of video/audio data between a plurality of display system devices is suppressed. A synchronous control device includes a coded-data adjustment unit 312 or a video and audio data adjustment unit 314 configured to perform frame adjustment based on a predetermined frame adjustment instruction by inserting predetermined frame data into a plurality of pieces of frame data in a chronological order or deleting a piece of frame data from the plurality of pieces of frame data, a video and audio data output unit 315 configured to sequentially output each piece of frame data subjected to the frame adjustment, and a video and audio data output time-point adjustment unit 316 configured to compare a reference time point for outputting each piece of the frame data with an output time point at which each
(Continued)

piece of the frame data is output. In the synchronous control device, the video and audio data output time-point adjustment unit 316 issues the frame adjustment instruction to insert predetermined frame data if the output time point precedes the reference time point by a threshold value or longer, and alternatively issues the frame adjustment instruction to delete a piece of frame data if the output time point is delayed from the reference time point by a threshold value or longer.

5 Claims, 8 Drawing Sheets

(51) Int. Cl.
      *H04N 21/44*     (2011.01)
      *H04N 21/2343*   (2011.01)

(58) Field of Classification Search
      USPC .................................................. 375/240.28
      See application file for complete search history.

(56) References Cited

OTHER PUBLICATIONS

Sato et al., "Surround Video Stitching and Synchronous Transmission Technology for Immersive Live Broadcasting of Entire Sports Venues," NTT Gijutu Journal, Oct. 1, 2017, 29(10):19-23, 12 pages (with English translation).

\* cited by examiner

SYNCHRONOUS CONTROL DEVICE, SYNCHRONOUS CONTROL METHOD, AND SYNCHRONOUS CONTROL PROGRAM

CROSS-REFERENCE TO RELATED APPLICATIONS

This application is a National Stage application under 35 U.S.C. § 371 of International Application No. PCT/JP2020/019465, having an International Filing Date of May 15, 2020, which claims priority to Japanese Application Serial No. 2019-102909, filed on May 31, 2019. The disclosure of the prior application is considered part of the disclosure of this application, and is incorporated in its entirety into this application.

TECHNICAL FIELD

The present invention relates to a technology for controlling synchronous of video/audio data.

BACKGROUND ART

In the enterprise field, there is a trend of integrating a plurality of monitoring locations, and the demand for a remote video monitoring technology for monitoring the plurality of monitoring locations from a remote location through the video is increasing. For example, a remote video monitoring system that realizes air traffic control that can monitor a plurality of airports at one location, public space monitoring that can collectively monitor airport lobbies, stations, and stadiums, and disaster prevention monitoring that can remotely monitor debris flows, tsunamis, and dams, is in demand.

The remote video monitoring system has a function to transmit a high-definition and wide-viewing-angle video to the monitoring side in real time in order to not only monitor a plurality of monitoring locations in an integrated manner, but also to effectively grasp the status of the wide monitoring area of each monitoring location, for example, rapidly realize strengthening of anti-terrorism measures and prevention of large-scale natural disasters from occurring.

For example, a remote video monitoring apparatus on the location side receives a plurality of camera videos (video/audio data) individually from a plurality of imaging system devices, and composes the plurality of pieces of received video/audio data. Then, the remote video monitoring apparatus synchronously transmits, to a remote video monitoring apparatus on the monitoring side, video/audio data of a panoramic video obtained by the composition and object information detected from video data by using an MPEG media transport (MMT) protocol via an IP network.

A remote video monitoring apparatus on a monitoring side receives video/audio data of a panoramic video and object information, and then synchronously outputs the received video/audio data to each of a plurality of display system devices (multi-screen) and outputs the received object information to each of the plurality of display system devices in synchronous with the video/audio data.

In such a remote video monitoring system, in a transmission section of the IP network, a network time protocol (NTP) is used. Thus, it is possible to ensure synchronous control between the video/audio data and the object information (Non Patent Literature 1).

CITATION LIST

Non Patent Literature

Non Patent Literature 1: "MMT-based Media Transport Scheme in Digital Broadcasting Systems," Standard, ARIB STD-B60, 1.13 Edition, Association of Radio Industries and Businesses, October 2018

SUMMARY OF THE INVENTION

Technical Problem

However, there is a problem that it is difficult to completely control synchronous among a plurality of pieces of video/audio data output from the remote video monitoring apparatus on the monitoring side, between the remote video monitoring apparatus on the monitoring side and the plurality of display system devices.

Figure 8:
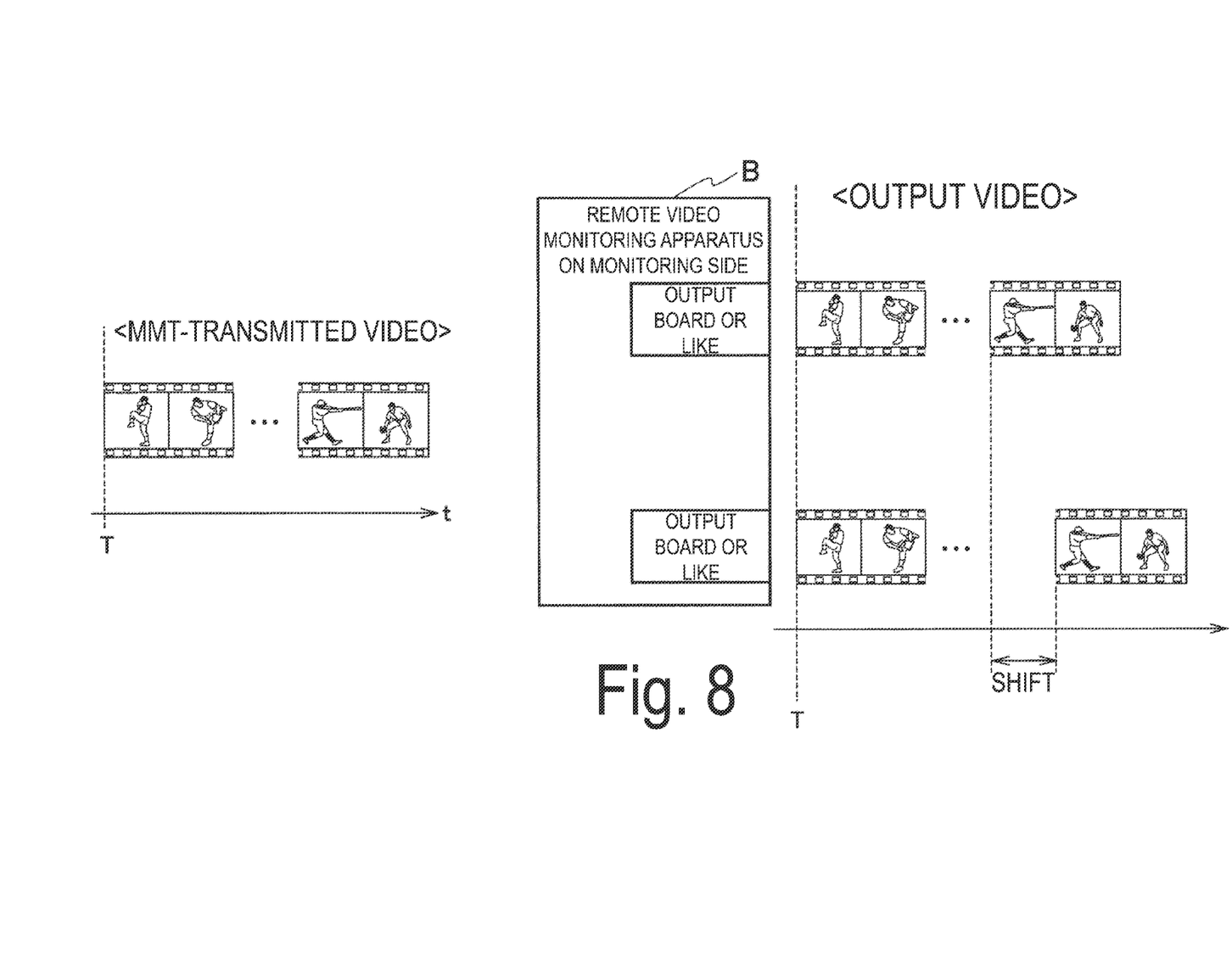
FIG. 8 is a diagram illustrating an image of a problem.

Specifically, as illustrated in FIG. 8, a plurality of output devices (output boards) in a remote video monitoring apparatus B on a monitoring side operate by the respective internal clocks. Thus, a shift occurs in output time intervals of a plurality of pieces of video/audio data, and a shift also occurs in a presentation time point for the plurality of display system devices. This causes an influence so that synchronous reproduction of the video/audio data may not be ensured in the plurality of display system devices. Even in a case of video/audio data that was originally synchronized, a small shift is accumulated, and thereby the total shift increases over a long period of time. For example, if an influence of the shift in the internal clock is 10 μsec per second, and a video having a frame rate of 60 fps is reproduced, a shift occurs at one frame per about 1667 seconds (≈28 minutes).

The present invention has been made in view of the above circumstances, and an object of the present invention is to suppress a synchronous shift of video/audio data between a plurality of display system devices.

Means for Solving the Problem

In order to solve the above problems, according to an aspect of the present invention, a synchronous control device synchronizes a plurality of pieces of data, the data being video data, audio data, or video and audio data. The synchronous control device includes a frame data acquisition unit configured to acquire a plurality of pieces of frame data from the data in a chronological order; a data adjustment unit configured to perform frame adjustment based on a predetermined frame adjustment instruction by inserting predetermined frame data into the plurality of pieces of frame data or deleting a piece of frame data from the plurality of pieces of frame data; a data output unit configured to sequentially output each piece of frame data subjected to the frame adjustment; and a data output time-point adjustment unit configured to compare a reference time point for outputting each piece of the frame data with an output time point at which each piece of the frame data is output. In the synchronous control device, the data output time-point adjustment unit issues the predetermined frame adjustment instruction for inserting the predetermined frame data, if the output time point precedes the reference time point by a threshold value or longer, and alternatively issues the predetermined frame adjustment instruction for deleting the piece of the frame data, if the output time point is delayed from the reference time point by a threshold value or longer.

In the synchronous control device, each piece of the frame data is coded, and the data adjustment unit determines a type of each piece of the frame data, inserts a full-frame if the predetermined frame adjustment instruction is an instruction to insert frame data, and alternatively deletes a difference frame preceding a full-frame by one frame if the predetermined frame adjustment instruction is an instruction to delete frame data.

According to another aspect of the present invention, a synchronous control method is performed by a synchronous control device that synchronizes a plurality of pieces of data, the data being video data, audio data, or video and audio data. The synchronous control method includes acquiring a plurality of pieces of frame data from the data in a chronological order; performing frame adjustment based on a predetermined frame adjustment instruction by inserting predetermined frame data into the plurality of pieces of frame data or deleting a piece of frame data from the plurality of pieces of frame data; sequentially outputting each piece of frame data subjected to the frame adjustment; and comparing a reference time point for outputting each piece of the frame data with an output time point at which each piece of the frame data is output. In the comparing of the synchronous control method, the predetermined frame adjustment instruction for inserting the predetermined frame data is issued if the output time point precedes the reference time point by a threshold value or longer, and alternatively the predetermined frame adjustment instruction for deleting the piece of the frame data is issued if the output time point is delayed from the reference time point by a threshold value or longer.

According to still another aspect of the present invention, there is provided a synchronous control program causing a computer to execute the synchronous control method.

Effects of the Invention

According to the present invention, it is possible to suppress a synchronous shift of video/audio data between a plurality of display system devices to the minimum.

DESCRIPTION OF EMBODIMENTS

Hereinafter, an embodiment of the present invention will be described with reference to the drawings.

In the embodiment, in order to solve the above problems, a synchronous control device, a synchronous control method, and a synchronous control program (simply referred to as a "synchronous control device" below in this paragraph) are disclosed. In the embodiment, an example in which the synchronous control device is applied to a remote video monitoring system will be described. The synchronous control device can also be applied to applications other than remote monitoring such as, for example, an information processing system used in public viewing in the entertainment field.

Remote Video Monitoring System

Firstly, a remote video monitoring system according to the embodiment will be described.

The remote video monitoring system is a system in which a remote video monitoring apparatus on a location side synchronously transmits video/audio data of a panoramic video obtained by composing a plurality of camera videos (video/audio data), and object information detected from video data to a remote video monitoring apparatus on a monitoring side via an IP network by using an MMT protocol. In a transmission section of the IP network, an NTP is used to realize synchronous control of the video/audio data and the object information with low latency.

Figure 1:
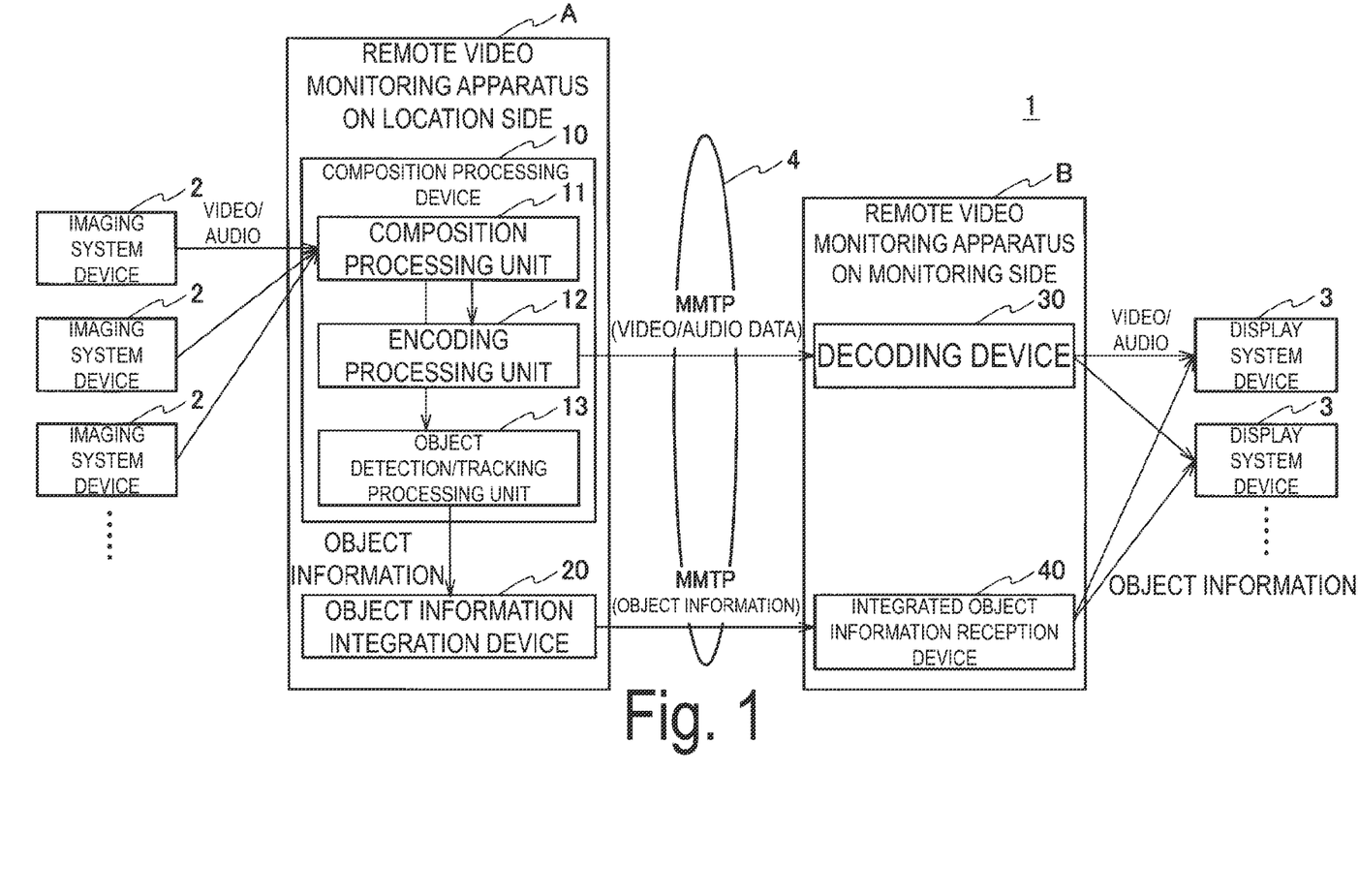
FIG. 1 is a diagram illustrating a configuration example of a remote video monitoring system.

FIG. 1 is a diagram illustrating a configuration example of a remote video monitoring system 1 according to the embodiment. The remote video monitoring system 1 includes a remote video monitoring apparatus A on a location side, which is disposed on the location side, and a remote video monitoring apparatus B on a monitoring side, which is disposed on the monitoring side.

Firstly, the remote video monitoring apparatus A on the location side will be described. As illustrated in FIG. 1, the remote video monitoring apparatus A on the location side includes, for example, a composition processing device 10 and an object information integration device 20.

The composition processing device 10 has a function of receiving a plurality of pieces of video/audio data individually from a plurality of imaging system devices 2 disposed on a location side, composing the plurality of pieces of received video data to generate a panoramic video, and detecting one or more objects from the received video data to perform tracking. Furthermore, the composition processing device 10 has a function of encoding video data and audio data of the generated panoramic video and transmitting the encoded video/audio data to the remote video monitoring apparatus B on the monitoring side via an IP network 4 by using the MMT protocol. In order to perform these functions, as illustrated in FIG. 1, the composition processing device 10 includes, for example, a composition processing unit 11, an encoding processing unit 12, and an object detection/tracking processing unit 13.

The composition processing unit 11 receives an input of video/audio data having a size of, for example, 4 K in maximum from the plurality of imaging system devices 2 by the respective SDI interfaces, performs synchronous at the input timing, and composes a plurality of pieces of synchronized video data in real time. When composing the plurality of pieces of video data, the composition processing unit 11 dynamically changes the seam of each piece of video data synchronized between the plurality of pieces of video data and utilizes the tracking process result obtained by tracking a predetermined object, in order to reduce an influence of disparity between the imaging system devices 2. Thus, improvement of composition quality is achieved.

The encoding processing unit 12 performs an encoding process (coding process) on video/audio data of the panoramic video obtained by the composition, converts the data into MMTP packets receivable by a decoding device 30 forming the remote video monitoring apparatus B on the monitoring side, and transmits the resultant of the conversion to the decoding device 30 via the IP network 4. For example, the encoding processing unit 12 encodes the input uncompressed video data with a high efficiency video coding (HEVC) codec or an advanced video coding (AVC) codec, encodes the input uncompressed audio data with an advanced audio coding (AAC) codec to convert the data into a MMTP stream and transmit the MMTP stream. At this time, the encoding processing unit 12 ensures synchronous with the object information transmitted from the object information integration device 20 by managing the timecode of the MMTP stream.

The object detection/tracking processing unit 13 detects and tracks one or more objects from the plurality of pieces of video data, and transmits the result obtained by detecting and tracking the object to the object information integration device 20 by Websocket as object information. A method of detecting and tracking an object can be realized using a known technique.

The object information integration device 20 receives the object information from the object detection/tracking processing unit 13 by Websocket, and converts coordinates of the object included in the received object information on a camera video to coordinates on a surround video. The object information integration device 20 integrates objects that simultaneously appear in the overlapping region into one object. The object information integration device 20 adds a predetermined cooperation key to tracking information in the object information, transmits an inquiry to a predetermined external server (not illustrated), and adds any additional information obtained in response to the inquiry to the tracking information. Then, the object information integration device 20 generates a signaling message from the tracking information. The object information integration device 20 converts the signaling message into MMTP packets to convert the signaling message into a MMTP stream, and transmits the MMTP stream to an integrated object information reception device 40 forming the remote video monitoring apparatus B on the monitoring side, via the IP network 4 by using the MMT protocol.

Next, the remote video monitoring apparatus B on the monitoring side will be described. As illustrated in FIG. 1, the remote video monitoring apparatus B on the monitoring side includes, for example, a decoding device 30 and an integrated object information reception device 40.

The decoding device 30 receives the MMTP stream from the encoding processing unit 12 of the composition processing device 10 via the IP network 4. The decoding device 30 has a function of performing a decoding process on the coded video/audio data included in the MMTP packet in the received MMTP stream, performing synchronous control of the video/audio data decoded by the decoding process, among a plurality of output devices (not illustrated), and outputting the video/audio data to each of a plurality of display system devices 3.

The integrated object information reception device 40 receives the MMTP stream from the object information integration device 20 via the IP network 4. The integrated object information reception device 40 acquires object information included in the MMTP packet in the received MMTP stream, converts the coordinates of an object in the object information to coordinates of each asset for identifying video/audio components, and outputs the coordinates to each of the plurality of display system devices 3. Details regarding the asset are disclosed in Non Patent Literature 1.

In the actual operation, an addition information superimposition device that superimposes video/audio data and object information is provided between the decoding device 30 and the integrated object information reception device 40, and the display system device 3. Since the additional information superimposition device has a function of superimposing data information, the additional information superimposition device can be mounted in any of the decoding device 30, the integrated object information reception device 40, and the display system device 3. The imaging system device 2 is, for example, a 4 K camera. The display system device 3 is, for example, a display, and the plurality of display system devices 3 is a multi-screen.

Decoding Device

Figure 2:
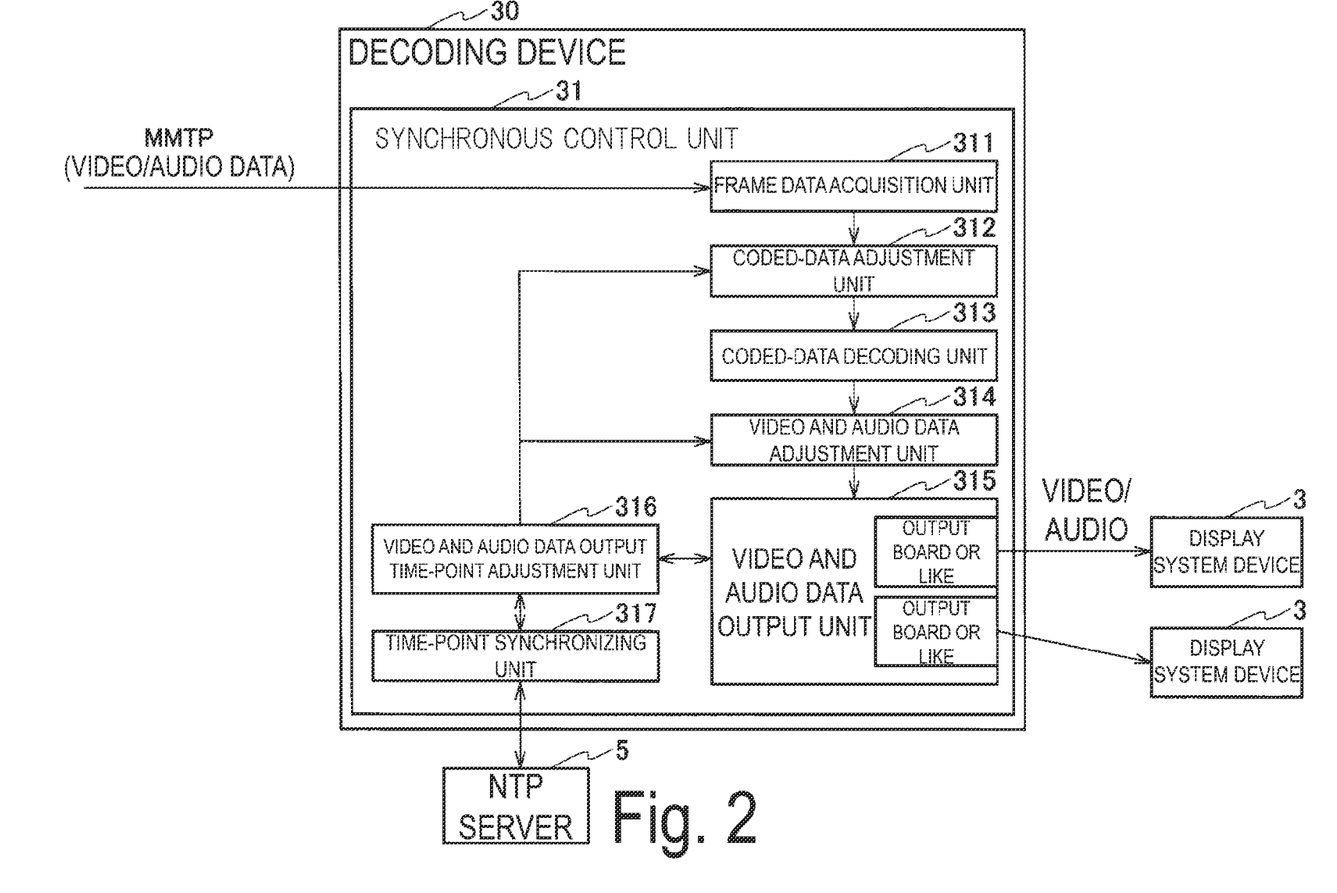
FIG. 2 is a diagram illustrating a configuration example of a decoding device.

Although the function of the decoding device 30 is as described above, in the embodiment, the decoding device 30 includes a synchronous control unit (synchronous control device) in order to solve the difficulty of completely controlling synchronous among a plurality of pieces of video/audio data output from the remote video monitoring apparatus on the monitoring side.

The synchronous control unit monitors each clock progress of the plurality of output devices in a video and audio data output unit described later. When detecting an occurrence of a shift among a plurality of pieces of frame data to be output, the synchronous control unit inserts or deletes frame data in response to the detected preceding or delay of the frame data. Specifically, if the clock of the output device is fast, the synchronous control unit performs a repeat process in which a frame is inserted when preceding time corresponds to one frame. Alternatively, if the clock of the output device is delayed, the synchronous control unit performs a skip process in which a frame is deleted when delayed time corresponds to one frame. This causes the output timings of the individual pieces of video/audio data to be individually adjusted, and enables the occurrence of a synchronous shift among the plurality of pieces of video/audio data to be suppressed to the minimum.

FIG. 2 is a diagram illustrating a configuration example of the decoding device 30 including the synchronous control unit. The decoding device 30 performs control for improving the synchronous accuracy of a plurality of pieces of video/audio data to be output individually at approximately the same timing to the plurality of display system devices 3. For example, the decoding device 30 includes a frame data acquisition unit 311, a coded-data adjustment unit 312, a coded-data decoding unit 313, a video and audio data adjustment unit 314, a video and audio data output unit 315, a video and audio data output time-point adjustment unit 316, and a time-point synchronizing unit 317. Some of the functions, for example, the coded-data decoding unit 313 is the known functional unit of the decoding device 30.

The frame data acquisition unit 311 has a function of receiving an MMTP stream from the composition processing device 10 via the IP network 4, and acquiring the plurality of pieces of frame data from the coded video/audio data included in the received MMTP stream in a chronological order.

The coded-data adjustment unit (data adjustment unit) 312 has a function of performing frame adjustment, when receiving a frame adjustment instruction from the video and audio data output time-point adjustment unit 316, by inserting predetermined frame data into the plurality of pieces of acquired frame data or deleting a piece of frame data from the plurality of pieces of frame data, based on instruction details of the frame adjustment instruction. The coded-data adjustment unit 312 also has a function of, when not receiving the frame adjustment instruction from the video and audio data output time-point adjustment unit 316, not performing the frame adjustment on the plurality of pieces of acquired frame data.

The coded-data decoding unit 313 has a function of receiving a plurality of pieces of frame data transmitted from the frame data acquisition unit 311 via the coded-data adjustment unit 312 and performing a decoding process on each of the plurality of pieces of received frame data.

The frame data before the decoding process is referred to as a "coded frame", and the frame data after the decoding process is referred to as a "video/audio frame".

The video and audio data adjustment unit (data adjustment unit) 314 has a function of performing frame adjustment, when receiving a frame adjustment instruction from the video and audio data output time-point adjustment unit 316, by inserting a predetermined video/audio frame into a plurality of decoded video/audio frames or deleting a video/audio frame from the plurality of decoded video/audio frames, based on instruction details of the frame adjustment instruction. The video and audio data adjustment unit 314 also has a function of, when not receiving the frame adjustment instruction from the video and audio data output time-point adjustment unit 316, not performing the frame adjustment on the plurality of decoded video/audio frames.

The video and audio data output unit (data output unit) 315 has a function of sequentially outputting the plurality of video/audio frames subjected to the frame adjustment by either one or both of the coded-data adjustment unit 312 and the video and audio data adjustment unit 314, to each of the plurality of display system devices 3 from the plurality of output devices in accordance with a reference time point designated based on the NTP.

The video audio data output time-point adjustment unit (data output time-point adjustment unit) 316 has a function of notifying the video and audio data output unit 315 of the reference time point designated at time intervals in accordance with a frame rate of a camera video. The reference time point is a time point based on NTP-based time-point information a notification of which is performed by the time-point synchronizing unit 317.

The video and audio data output time-point adjustment unit 316 has a function of comparing the reference time point designated for outputting each video/audio frame with an output time point at which each video/audio frame is actually output. The video and audio data output time-point adjustment unit 316 has a function of issuing a frame adjustment instruction to insert a predetermined coded frame to the coded-data adjustment unit 312 if the output time point precedes the reference time point by a threshold value or longer, and issuing a frame adjustment instruction to delete a coded frame to the coded-data adjustment unit 312, if the output time point is delayed from the reference time point by a threshold value or longer.

The video and audio data output time-point adjustment unit 316 has a function of comparing the reference time point designated for outputting each video/audio frame with an output time point at which each video/audio frame is actually output. The video and audio data output time-point adjustment unit 316 also has a function of issuing a frame adjustment instruction to insert a predetermined video/audio frame to the video and audio data adjustment unit 314, if the output time point precedes the reference time point by a threshold value or longer, and alternatively issuing a frame adjustment instruction to delete a video/audio frame to the video and audio data adjustment unit 314, if the output time point is delayed from the reference time point by a threshold value or longer.

The video and audio data output time-point adjustment unit 316 can output the frame adjustment instruction to either one or both of the coded-data adjustment unit 312 and the video and audio data adjustment unit 314. Which data adjustment unit is caused to function may be determined based on setting information set in advance by a user or may be set at any time by the user.

The time-point synchronizing unit 317 has a function of receiving time-point information from an external NTP server 5 and notifying the video and audio data output time-point adjustment unit 316 of the received time-point information. The NTP server 5 generally provides time-point information based on an atomic clock or the like. Thus, the time-point information received from the NTP server 5 is accurate, and is time-point information appropriate as the original information of the reference time point.

The synchronous control unit 31 can be realized by a computer including a CPU, a memory, an input/output interface, a communication interface, and the like, similar to the decoding device 30. Further, it is possible to create a synchronous control program causing a computer to function as the synchronous control unit 31, and a storage medium for the synchronous control program.

Synchronous Control Method

Next, a synchronous control method for controlling synchronous among a plurality of pieces of video/audio data will be described. In the synchronous control method, video data will be described as an example. Even in the case of audio data or video and audio data, the synchronous control method can be applied.

Synchronous Control Method with Coded Frame

Figure 3:
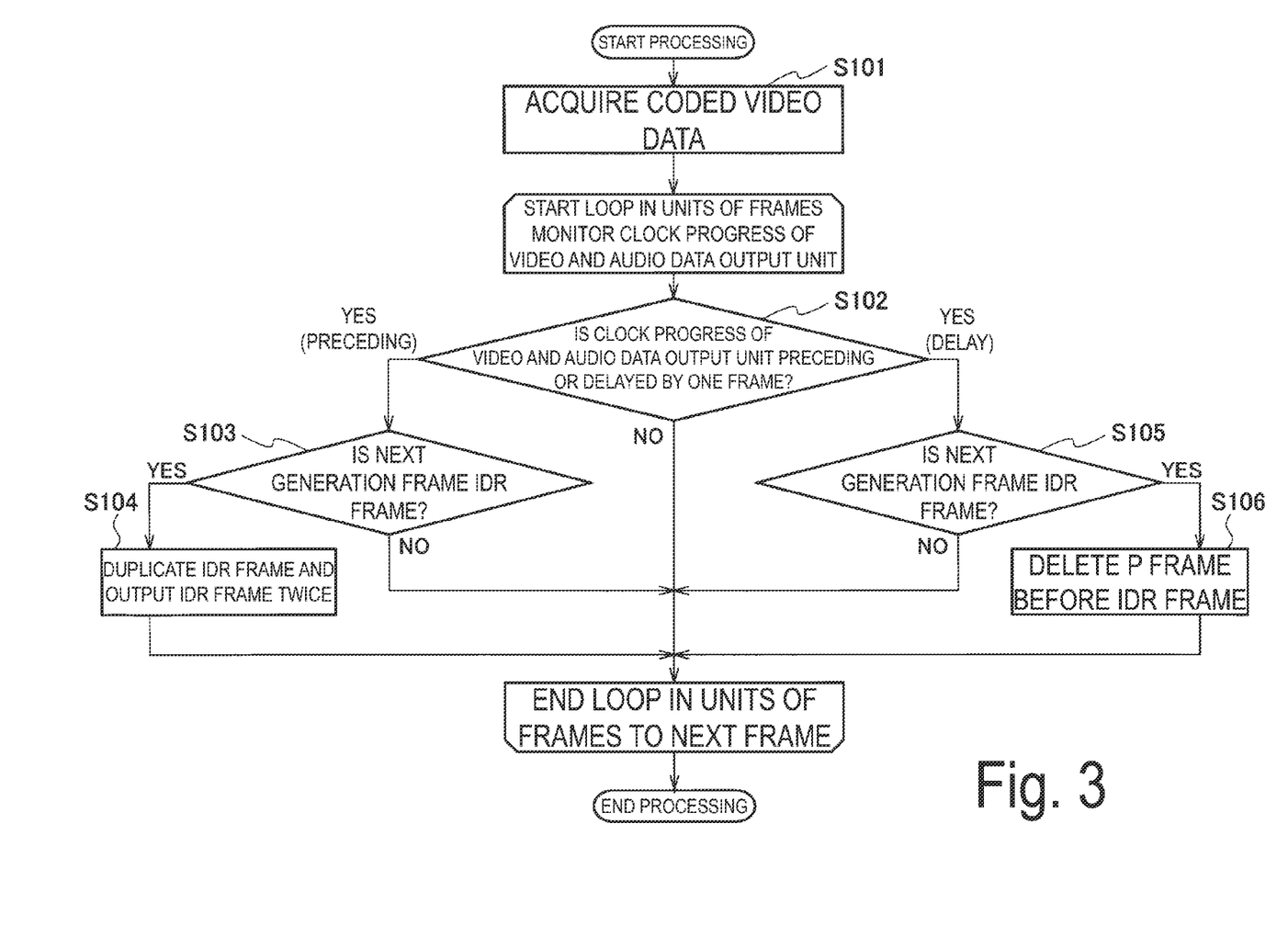
FIG. 3 is a flowchart illustrating a synchronous control process flow with a coded frame.

Firstly, a method of performing synchronous control using a coded frame will be described. FIG. 3 is a flowchart illustrating a synchronous control process flow in a coded frame, which is performed by the coded-data adjustment unit 312.

Step S101

Firstly, the frame data acquisition unit 311 receives an input of an MMTP stream (coded video data) transmitted from the composition processing device 10, and acquires a plurality of coded frames from the input video data in a chronological order. Then, the synchronous control unit 31 performs Steps S102 to S106 described later, for each coded frame.

Step S102

Firstly, the video and audio data output time-point adjustment unit 316 compares the reference time point designated for outputting each video frame related to each of a plurality of coded frames, with an output time point at which each video frame is actually output from the video and audio data output unit 315, and determines whether the output time point precedes the reference time point by one frame or is delayed from the reference time point by one frame.

For example, in the case of a video having a frame rate of 60 fps, a frame time interval is set to approximately 16.66 msec. Thus, if the output time point of the video frame is earlier than the reference time point by 16.66 msec, the video and audio data output time-point adjustment unit 316 determines that the output time point precedes the reference time point by one frame. Alternatively, if the output time point of the video frame is later than the reference time point by 16.66 msec, the video and audio data output time-point adjustment unit 316 determines that the output time point is delayed from the reference time point by one frame. If the output time point precedes the reference time point by one frame, the process proceeds to Step S103. If the output time point is delayed from the reference time point by one frame, the process proceeds to Step S105. If output time point either does not precede the reference time point or is not delayed from the reference time point, by one frame, the video and audio data output time-point adjustment unit ends the process and then processes the next coded frame.

Step S103

If the output time point precedes the reference time point by one frame, the video and audio data output time-point adjustment unit 316 issues a frame adjustment instruction to insert a coded frame, to the coded-data adjustment unit 312. Then, after receiving the frame adjustment instruction, the coded-data adjustment unit 312 determines the type of coded data as a processing target and determines whether the next coded frame is an IDR frame (full-frame: one entire image frame). If the next coded frame is the IDR frame, the coded-data adjustment unit 312 causes the process to proceed to Step S104. Alternatively, if the next coded frame is not the IDR frame, the coded-data adjustment unit 312 ends the process and then processes the next coded frame.

Step S104

Figure 4:
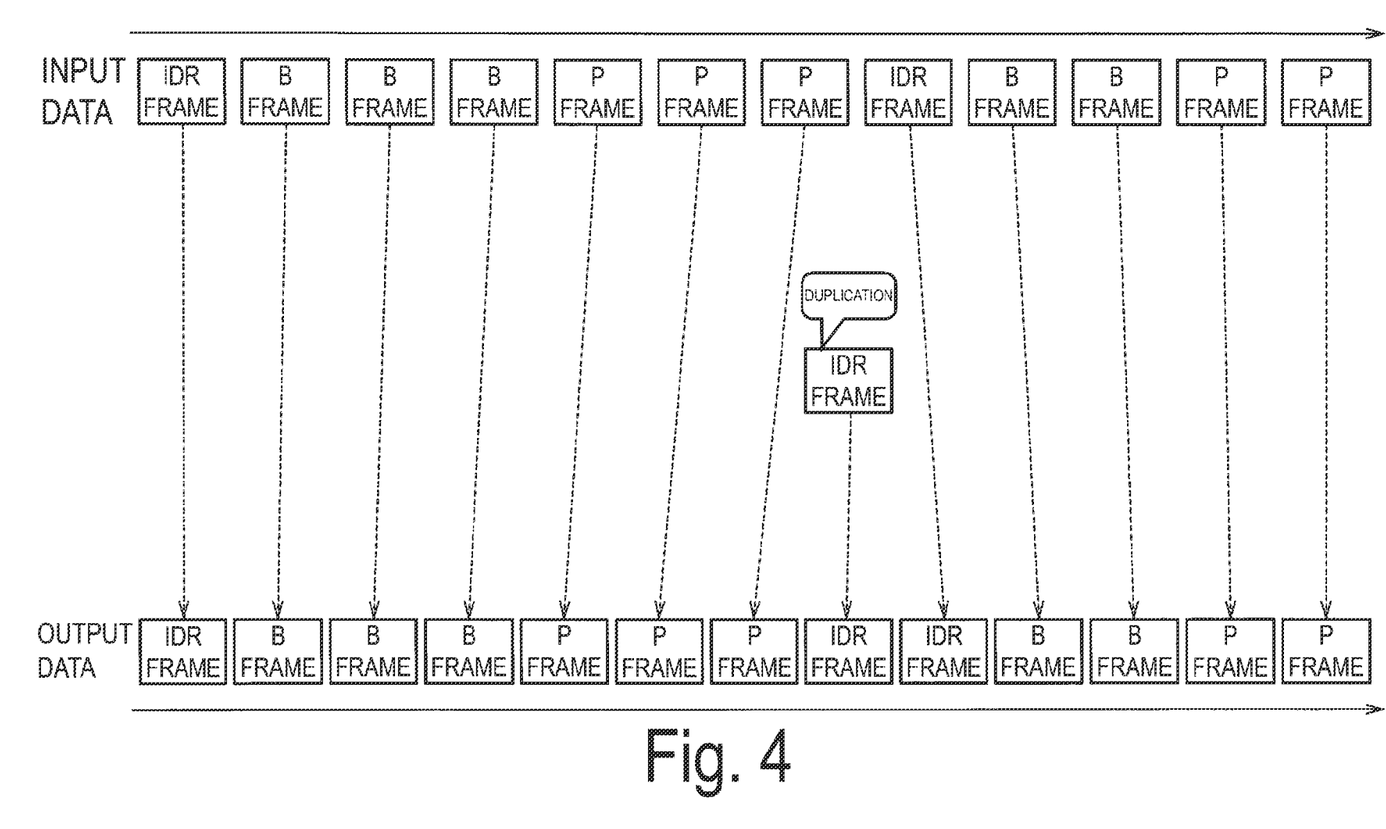
FIG. 4 is a diagram illustrating an image of frame data after an insertion process.

If the next coded frame is the IDR frame, the coded-data adjustment unit 312 duplicates and inserts the IDR frame, as illustrated in FIG. 4. Then, the coded-data adjustment unit 312 ends the process and then processes the next coded frame.

In other words, in Steps S102 to S104, the video and audio data output time-point adjustment unit 316 monitors the clock progress of the output device of the video and audio data output unit 315. If the clock progress is fast, the coded-data adjustment unit 312 performs a repeat process in which a coded frame is duplicated and inserted when the output time point precedes the reference time point by one frame. In this case, the coded-data adjustment unit 312 performs the repeat processing of waiting for the generation of the next IDR frame and, when the IDR frame is generated, duplicating and inserting the IDR frame. Thus, it is possible to realize the recovery from a synchronous shift of one frame while avoiding an influence on image quality.

Step S105

If the output time point is delayed from the reference time point by one frame, the video and audio data output time-point adjustment unit 316 issues a frame adjustment instruction to delete a coded frame, to the coded-data adjustment unit 312. Then, after receiving the frame adjustment instruction, the coded-data adjustment unit 312 determines the type of coded data as a processing target and determines whether the next coded frame is an IDR frame. If the next coded frame is the IDR frame, the coded-data adjustment unit 312 causes the process to proceed to Step S106. Alternatively, if the next coded frame is not the IDR frame, the coded-data adjustment unit 312 ends the process and then processes the next coded frame.

Step S106

Figure 5:
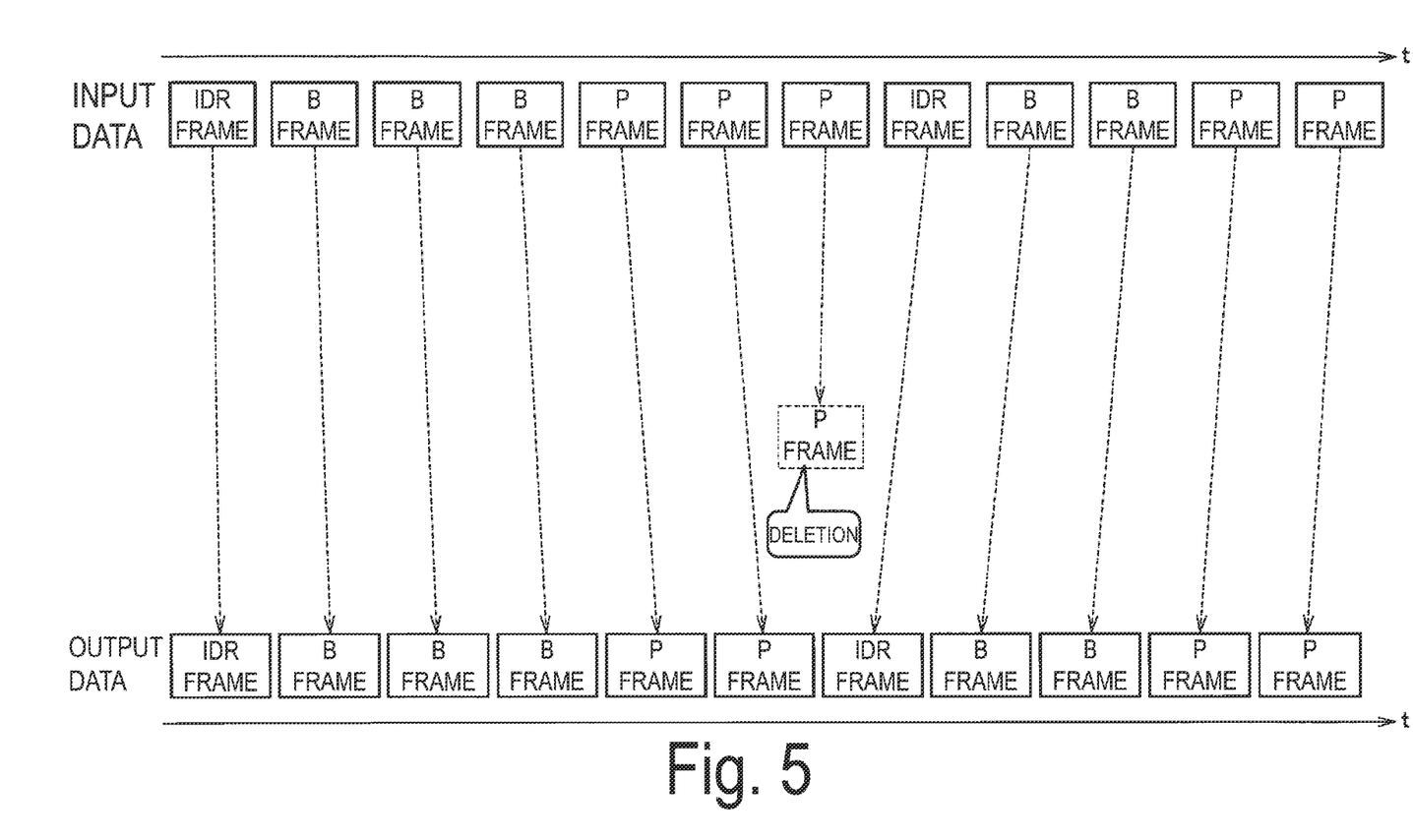
FIG. 5 is a diagram illustrating an image of frame data after a deletion process.

If the next coded frame is the IDR frame, the coded-data adjustment unit 312 deletes a P frame (difference frame; difference image frame from the IDR frame) preceding the IDR frame by one frame, as illustrated in FIG. 5. Then, the coded-data adjustment unit 312 ends the process and then processes the next coded frame. A B frame illustrated in FIG. 5 is also a difference frame.

In other words, in Steps S102, S105, and S106, the video and audio data output time-point adjustment unit 316 monitors the clock progress of the output device of the video and audio data output unit 315. If the clock progress is slow, the coded-data adjustment unit 312 performs a skip process in which a coded frame is deleted when the output time point is delayed from the reference time point by one frame. In this case, the coded-data adjustment unit 312 waits for the generation of the IDR frame, and deletes a P frame preceding the IDR frame by one frame when the IDR frame is generated. Thus, it is possible to realize the recovery from the synchronous shift of one frame without an influence on image quality.

Synchronous Control Method with Video Frame

Figure 6:
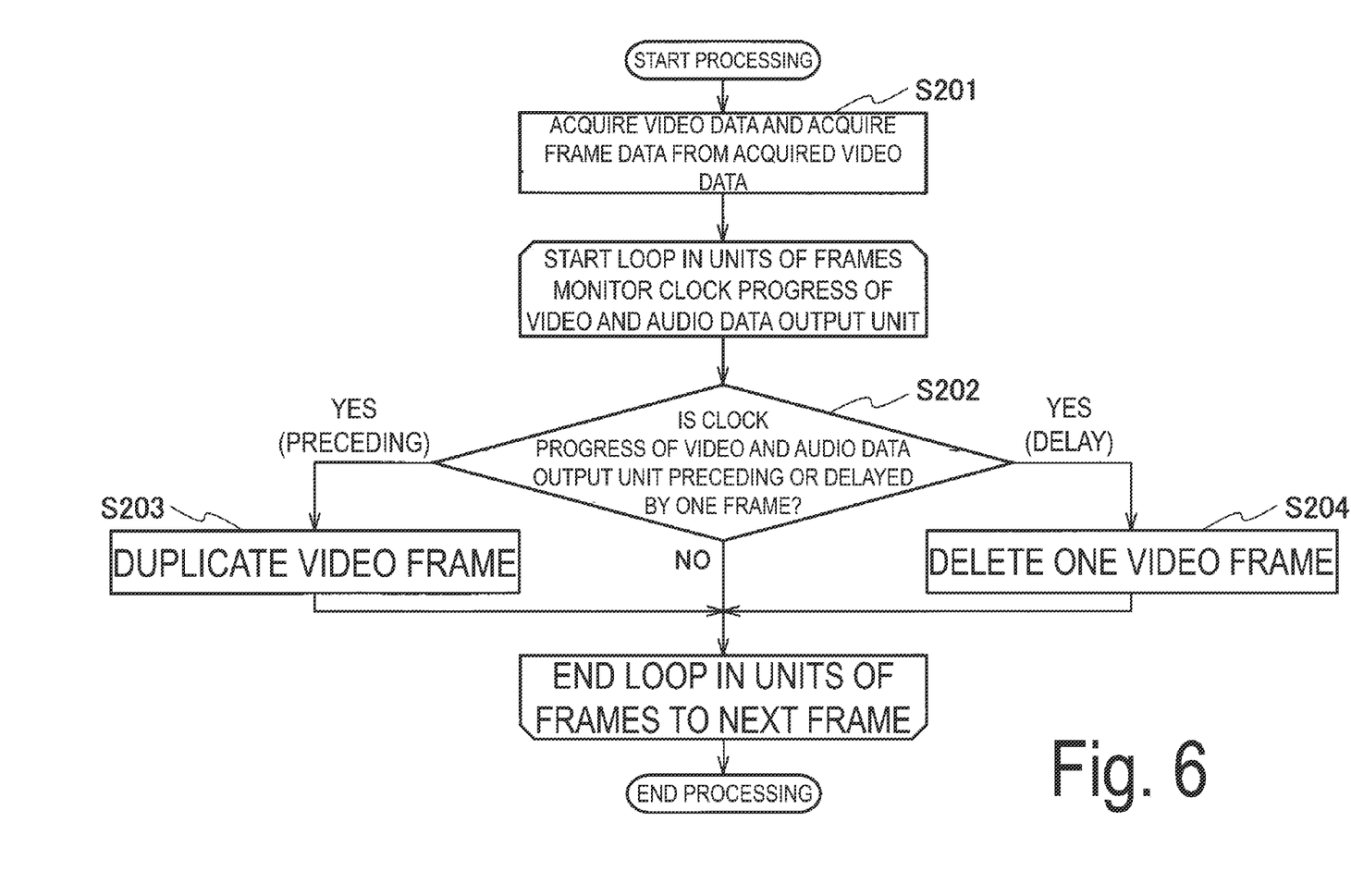
FIG. 6 is a flowchart illustrating the synchronous control process flow with a video frame.

Next, a method of performing synchronous control using a video frame will be described. FIG. 6 is a flowchart illustrating a synchronous control process flow in a video frame, which is performed by the video and audio data adjustment unit 314.

Step S201

Firstly, the frame data acquisition unit 311 receives an input of an MMTP stream (coded video data) transmitted from the composition processing device 10, and acquires a plurality of coded frames from the input video data in a chronological order. Then, the synchronous control unit 31 performs Steps S202 and S203 described later for each video frame obtained by decoding a coded frame.

Step S202

Firstly, the video and audio data output time-point adjustment unit 316 compares the reference time point designated for outputting each video frame with an output time point at which each video frame is actually output from the video and audio data output unit 315, and determines whether the output time point precedes the reference time point by one frame or is delayed from the reference time point by one frame. The determination method is similar to the specific example described in Step S102. If the output time point precedes the reference time point by one frame, the process proceeds to Step S203. If the output time point is delayed from the reference time point by one frame, the process proceeds to Step S204. If the output time point does not precede the reference time point or is not delayed from the reference time point, by one frame, the video and audio data output time-point adjustment unit 316 ends the process and then processes the next video frame.

Step S203

Figure 7:
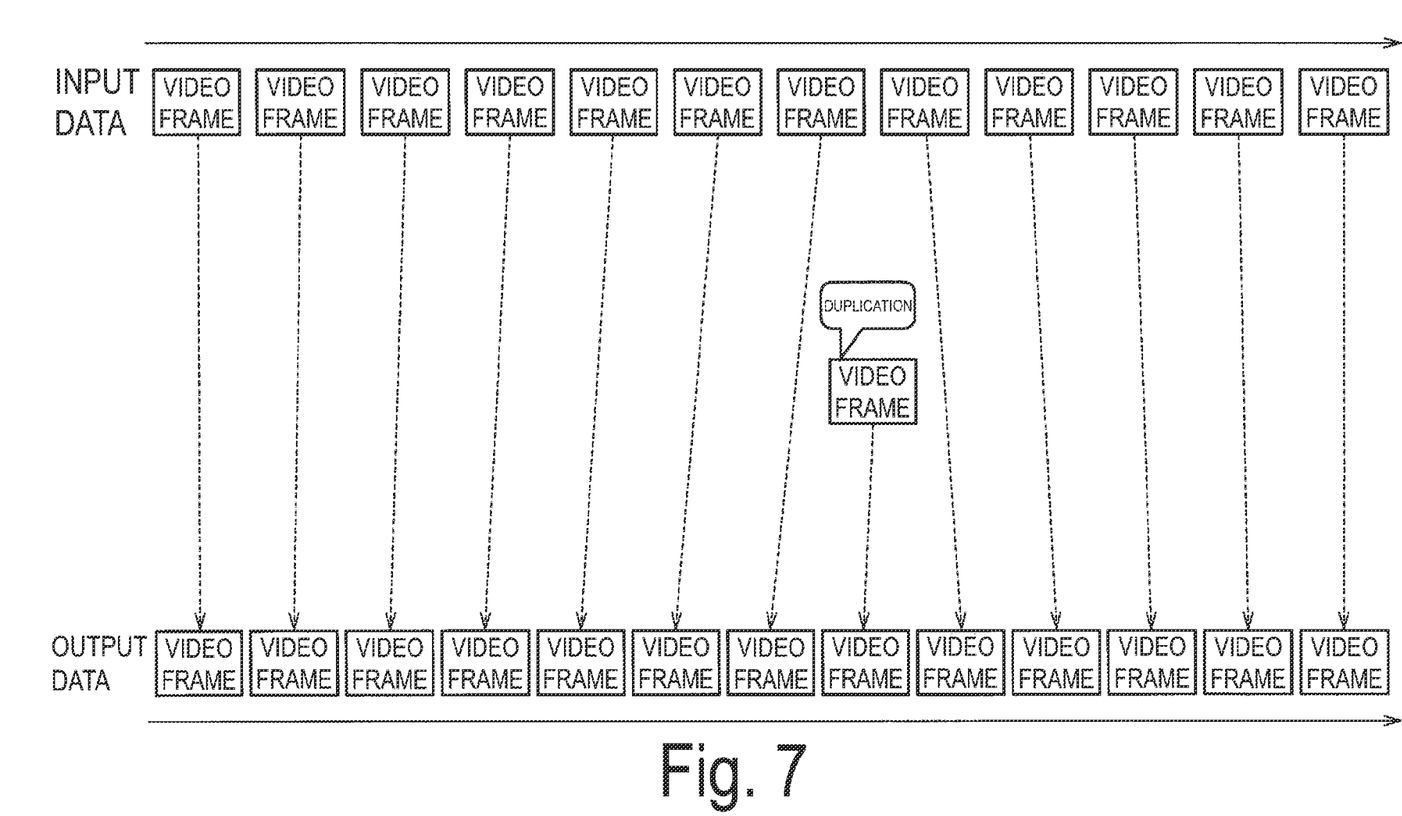
FIG. 7 is a diagram illustrating an image of frame data after the insertion process.

If the output time point precedes the reference time point by one frame, the video and audio data output time-point adjustment unit 316 issues a frame adjustment instruction to insert a video frame, to the video and audio data adjustment unit 314. Then, after receiving the frame adjustment instruction, the video and audio data adjustment unit 314 duplicates and inserts a video frame preceding or following the processing target by one frame, as illustrated in FIG. 7.

Step S204

If the output time point is delayed from the reference time point by one frame, the video and audio data output time-point adjustment unit 316 issues a frame adjustment instruction to delete a video frame, to the video and audio data adjustment unit 314. Then, after receiving the frame adjustment instruction, the video and audio data adjustment unit 314 deletes a video frame as the processing target.

Then, the processes of Steps S202 to S204 are repeated for the next video frame.

In other words, in Steps S202 and S203, the video and audio data output time-point adjustment unit 316 monitors the clock progress of the output device of the video and audio data output unit 315. If the clock progress is fast, the video and audio data adjustment unit 314 performs a repeat process in which a video frame is duplicated and inserted when the output time point precedes the reference time point by one frame. Thus, it is possible to realize the recovery from a synchronous shift of one frame while avoiding an influence on image quality.

In Steps S202 and S204, if the clock progress is slow, the video and audio data adjustment unit 314 performs the skip process in which a video frame is deleted when the output time point is delayed from the reference time point by one frame. Thus, it is possible to realize the recovery from the synchronous shift of one frame without an influence on image quality.

Effects of Embodiment

As described above, according to the embodiment, the synchronous control device includes the frame data acquisition unit 311 configured to acquire a plurality of pieces of frame data from coded video/audio data in a chronological order, the coded-data adjustment unit 312 or the video and audio data adjustment unit 314 configured to perform frame adjustment by inserting predetermined frame data into a plurality of pieces of frame data (coded frame before the decoding process, video/audio frame after the decoding process) or deleting a piece of frame data from the plurality of pieces of frame data, based on the predetermined frame adjustment instruction, the video and audio data output unit 315 configured to sequentially output each piece of frame data subjected to the frame adjustment, and the video and audio data output time-point adjustment unit 316 configured to compare a reference time point for outputting each piece of the frame data with an output time point at which each piece of the frame data is output. In the synchronous control device, the video and audio data output time-point adjustment unit 316 issues the frame adjustment instruction to insert predetermined frame data if the output time point precedes the reference time point by a threshold value or longer, and alternatively issues the frame adjustment instruction to delete a piece of frame data if the output time point is delayed from the reference time point by a threshold value or longer. Thus, it is possible to suppress the synchronous shift of a plurality of pieces of video/audio data among a plurality of display system devices to the minimum in a remote video monitoring system.

In addition, according to the embodiment, each piece of frame data is coded, and the coded-data adjustment unit 312 determines the type of each coded frame. If the frame adjustment instruction is an instruction to insert a coded frame, the coded-data adjustment unit 312 inserts an IDR frame. Alternatively if the frame adjustment instruction is an instruction to delete a coded frame, the coded-data adjustment unit 312 deletes a P frame preceding the IDR frame by one frame. Thus, it is possible to suppress the synchronous shift of a plurality of pieces of video/audio data among a plurality of display system devices to the minimum in a remote video monitoring system.

REFERENCE SIGNS LIST

1 Remote video monitoring system
2 Imaging system device
3 Display system device
4 IP network
5 NTP server
10 Composition processing device
11 Composition processing unit
12 Encoding processing unit
13 Object detection/tracking processing unit
20 Object information integration device
30 Decoding device
31 Synchronous control unit
311 Frame data acquisition unit
312 Coded-data adjustment unit
313 Coded-data decoding unit
314 Video and audio data adjustment unit
315 Video and audio data output unit
316 Video and audio data output time-point adjustment unit
317 Time-point synchronizing unit
40 Integrated object information reception device
A Remote video monitoring apparatus on location side
B Remote video monitoring apparatus on monitoring side

The invention claimed is:

1. A synchronous control device for synchronizing a plurality of data output from a decoding device, the plurality of data comprising video data, audio data, or video and audio data, the synchronous control device comprise:
    a frame data acquisition unit, including one or more processors, configured to acquire a plurality of frame data from the plurality of data in a chronological order;
    a first data adjustment unit, including one or more processors, configured to perform frame adjustment based on a predetermined frame adjustment instruction before decoding the plurality of frame data by inserting predetermined frame data into non-decoded plurality of frame data or deleting a piece of frame data from the non-decoded plurality of of frame data;
    a second data adjustment unit, including one or more processors, configured to perform frame adjustment based on a predetermined frame adjustment instruction after decoding the plurality of frame data by inserting predetermined frame data into the decoded plurality of frame data or deleting a piece of frame data from the decoded plurality of frame data;
    a data output unit, including one or more processors, configured to sequentially output from the decoding device each of the frame data subjected to the frame adjustment by one or both of the first data adjustment unit and the second data adjustment unit; and
    a data output time-point adjustment unit, including one or more processors, configured to compare a reference time point for outputting each of the frame data with an output time point at which each of the frame data is output,
    wherein the data output time-point adjustment unit is configured to:
        issue the predetermined frame adjustment instruction to one or both of the first data adjustment unit and the second data adjustment unit based on user's settings,
        issue the predetermined frame adjustment instruction for inserting the predetermined frame data, if the output time point precedes the reference time point by a threshold value or longer, and
        issue the predetermined frame adjustment instruction for deleting the piece of the frame data, if the output time point is delayed from the reference time point.

2. The synchronous control device according to claim 1, wherein, and the first data adjustment unit is configured to:
    determine a type of each of the non-decoded frame data,
    insert a full-frame if the predetermined frame adjustment instruction is an instruction to insert frame data, and delete a difference frame preceding the full-frame by one frame if the predetermined frame adjustment instruction is an instruction to delete the frame data.

3. The synchronous control device of claim 1, wherein the data output time-point adjustment unit is configured to issue the predetermined frame adjustment instruction to both of the first data adjustment unit and the second data adjustment unit.

4. A synchronous control method performed by a synchronous control device that synchronizes a plurality of data output from a decoding device, the plurality of data comprising video data, audio data, or video and audio data, the synchronous control method comprising:
   acquiring, by a frame data acquisition unit, a plurality of frame data from the plurality of data in a chronological order;
   performing, by a first data adjustment unit, frame adjustment based on a predetermined frame adjustment instruction before decoding the plurality of frame data by inserting predetermined frame data into non-decoded plurality of frame data or deleting a piece of frame data from the non-decoded plurality of frame data;
   performing, by a second data adjustment unit, frame adjustment based on a predetermined frame adjustment instruction after decoding the plurality of frame data by inserting predetermined frame data into the decoded plurality of frame data or deleting a piece of frame data from the decoded plurality of frame data;
   sequentially outputting, by a data output unit and from the decoding device, each of the frame data subjected to the frame adjustment by one or both of the first data adjustment unit and the second data adjustment unit; and
   comparing, by a data output time-point adjustment unit, a reference time point for outputting each of the frame data with an output time point at which each of the frame data is output,
   wherein, in the comparing,
      issuing the predetermined frame adjustment instruction to one or both of the first data adjustment unit and the second data adjustment unit based on user's settings,
      issuing the predetermined frame adjustment instruction for inserting the predetermined frame data, if the output time point precedes the reference time point by a threshold value or longer, and
      issuing the predetermined frame adjustment instruction for deleting the piece of the frame data, if the output time point is delayed from the reference time point by a threshold value or longer.

5. A non-transitory recording medium storing a synchronous control program for causing a computer to execute a synchronous control method performed by a synchronous control device that synchronizes a plurality of data output from a decoding device, the plurality of data comprising video data, audio data, or video and audio data, wherein executing of the synchronous control program causes one or more computers to perform operations comprise:
   acquiring, by a frame data acquisition unit, a plurality of frame data from the plurality of data in a chronological order;
   performing, by a first data adjustment unit, frame adjustment based on a predetermined frame adjustment instruction before decoding the plurality of frame data by inserting predetermined frame data into non-decoded plurality of frame data or deleting a piece of frame data from the non-decoded plurality of frame data;
   performing, by a second data adjustment unit, frame adjustment based on a predetermined frame adjustment instruction after decoding the plurality of frame data by inserting predetermined frame data into the decoded plurality of frame data or deleting a piece of frame data from the decoded plurality of frame data;
   sequentially outputting, by a data output unit and from the decoding device, each of the frame data subjected to the frame adjustment by one or both of the first data adjustment unit and the second data adjustment unit; and
   comparing, by a data output time-point adjustment unit, a reference time point for outputting each of the frame data with an output time point at which each of the frame data is output,
   wherein, in the comparing,
      issuing the predetermined frame adjustment instruction to one or both of the first data adjustment unit and the second data adjustment unit based on user's settings,
      issuing the predetermined frame adjustment instruction for inserting the predetermined frame data, if the output time point precedes the reference time point by a threshold value or longer, and
   issuing the predetermined frame adjustment instruction for deleting the piece of the frame data, if the output time point is delayed from the reference time point by a threshold value or longer.

* * * * *